(12) United States Patent
Morita (10) Patent No.: US 12,502,233 B2
(45) Date of Patent: Dec. 23, 2025

(54) FLOATING DRIVE MECHANISM FOR MEDICAL ROBOT AND MEDICAL ROBOT

(71) Applicant: RIVERFIELD INC., Tokyo (JP)

(72) Inventor: Naoya Morita, Tokyo (JP)

(73) Assignee: RIVERFIELD INC., Tokyo (JP)

( * ) Notice: Subject to any disclaimer, the term of this patent is extended or adjusted under 35 U.S.C. 154(b) by 669 days.

(21) Appl. No.: 17/899,003

(22) Filed: Aug. 30, 2022

(65) Prior Publication Data

US 2022/0409312 A1 Dec. 29, 2022

Related U.S. Application Data

(63) Continuation of application No. PCT/JP2020/016952, filed on Apr. 17, 2020.

(51) Int. Cl.
*A61B 34/30* (2016.01)
*A61B 17/00* (2006.01)
*A61B 34/00* (2016.01)
*A61B 90/00* (2016.01)

(52) U.S. Cl.
CPC .............. *A61B 34/30* (2016.02); *A61B 34/77* (2016.02); *A61B 90/06* (2016.02); *A61B 2017/00544* (2013.01); *A61B 2090/064* (2016.02)

(58) Field of Classification Search
CPC ......... A61B 34/30; A61B 34/77; A61B 90/06; A61B 2017/00544; A61B 2090/064
See application file for complete search history.

(56) References Cited

U.S. PATENT DOCUMENTS

| 2012/0059360 | A1  |  3/2012 | Namiki |
| 2019/0159853 | A1* |  5/2019 | Haraguchi ............. A61B 34/70 |
| 2023/0016675 | A1* |  1/2023 | Morita ................... A61B 46/10 |
| 2024/0261042 | A1* |  8/2024 | Morita ................... A61B 46/10 |
| 2024/0326268 | A1* | 10/2024 | Morita ................. B25J 19/0083 |

FOREIGN PATENT DOCUMENTS

| CN | 109640866 A    | 4/2019  |
| EP | 3 626 199 A1   | 3/2020  |
| JP | 2018-191881 A  | 12/2018 |
| JP | 2019-013445 A  | 1/2019  |

(Continued)

OTHER PUBLICATIONS

Notification of Reasons for Refusal dated Jul. 27, 2021 from the Japanese Patent Office in application No. 2021-523801.

(Continued)

*Primary Examiner* — Terence Boes
(74) *Attorney, Agent, or Firm* — Sughrue Mion, PLLC (57) ABSTRACT

A floating drive for a medical robot includes an actuator that drives a rod forward and backward in a first direction, a manipulation member that operates with driving force of the actuator, and a transmission member that is located between the actuator and the manipulation member and that is engaged with the rod to transmit an operation of the rod to the manipulation member. The transmission member is restricted in its displacement having a component in a second direction orthogonal to the first direction, and the transmission member is separated from the rod in the second direction and transmitting force in the first direction from the rod to the manipulation member.

12 Claims, 8 Drawing Sheets

(56) References Cited

FOREIGN PATENT DOCUMENTS

| | | |
|---|---|---|
| JP | 2020-005784 A | 1/2020 |
| WO | 2012/153871 A1 | 11/2012 |
| WO | 2016/194263 A1 | 12/2016 |
| WO | 2018/159070 A1 | 9/2018 |

OTHER PUBLICATIONS

Office Action dated Feb. 11, 2023 from the Chinese Patent Office in Application No. 202080095520.9.
International Search Report for PCT/JP2020/016952 dated Jul. 21, 2020.
Written Opinion for PCT/JP2020/016952 dated Jul. 21, 2020.

\* cited by examiner

FLOATING DRIVE MECHANISM FOR MEDICAL ROBOT AND MEDICAL ROBOT

CROSS REFERENCE TO RELATED APPLICATIONS

This application is a continuation of International Application No. PCT/JP2020/016952 filed Apr. 17, 2020, the contents of which being incorporated by reference herein in its entirety.

BACKGROUND

The present disclosure relates to a floating drive for a medical robot that manipulates a surgical tool by an actuator and relates also to a medical robot.

Surgery using medical robots is attracting attention as a technique that enhances the possibility of reducing the burden on a surgeon but also the burden on a patient through highly accurate and stable treatment as well as the possibility of remote medical care.

SUMMARY

According to an aspect of one or more embodiments, there is provided a floating drive for a medical robot, the floating drive comprising an actuator that drives a rod to be able to move forward and backward in a first direction; a manipulation member that operates with driving force of the actuator; and a transmission member that is located between the actuator and the manipulation member and is engaged with the rod to transmit an operation of the rod to the manipulation member, the transmission member being restricted in its displacement having a component in a second direction orthogonal to the first direction, the transmission member being separated from the rod in the second direction and transmitting force in the first direction from the rod to the manipulation member.

According to another aspect of one or more embodiments, there is provided a floating drive for a medical robot, the floating drive comprising an actuator that drives a rod forward and backward in a first direction; a manipulation member that operates with a driving force of the actuator; and a transmission member located between the actuator and the manipulation member, the transmission member being engaged with the rod to transmit an operation of the rod to the manipulation member, wherein the transmission member has a displacement having a component in a second direction orthogonal to the first direction, and the displacement of the transmission member is restricted, and the transmission member is separated from the rod in the second direction and transmits force in the first direction from the rod to the manipulation member.

According to yet another aspect of one or more embodiments, there is provided apparatus for a medical robot, the apparatus comprising an actuator that drives a rod to move forward and backward in a first direction; a plate comprising a first portion extending in a length direction and a second portion connected to the first portion in a same plane as the first portion, the plate operating with a driving force of the actuator; and a first rectangular block with at least one second rectangular block provided at an end of the first rectangular block and separated by less than a width of the first rectangular block, the first rectangular block with the at least one second rectangular block being located between the actuator and the plate and being engaged with the rod to transmit an operation of the rod to the plate.

BRIEF DESCRIPTION OF DRAWINGS

The above and/or other aspects will become apparent and more readily appreciated from the following description of exemplary embodiments, taken in conjunction with the accompanying drawings in which.

DETAILED DESCRIPTION

A manipulator system in some cases can easily improve an accuracy of movement and suppress an occurrence of trouble due to disturbance in a surgical manipulator having a pneumatically driven external force detection function.

A medical manipulator system may be capable of highly accurate external force estimation. In some cases, a motive power transmission adapter and a medical manipulator system may be capable of suppressing mixture of a clean region and an unclean region and may improve ease and safety of attachment and detachment of a surgical tool.

However, in medical robots, to transmit the driving force of an actuator to a surgical tool, a number of elements are involved, such as an actuator that serves as the driving source for driving the surgical tool, a manipulation member that transmits the driving force to the surgical tool, and a transmission member that transmits the driving force from the actuator to the manipulation member. For this reason, the gap (backlash) between such elements tends to cause a difference in the operation ratio between the input side (actuator side) and the output side (surgical tool side), and a delay in the responsiveness also tends to occur. It is therefore important not to convey the runout component (axis deviation) included in the operation of each element to the surgical tool.

Moreover, if the external force having a component orthogonal to the intended operating direction of a rod of the actuator is applied to the rod due to the misalignment of the operation of other elements mechanically connected to the actuator, a load is applied to the rod to cause an increase in the sliding resistance with respect to the movement of the rod in the intended operating direction. When the medical robot is provided with a force sensor that detects the force (reaction force) transmitted from the surgical tool to the surgeon, the increase in the sliding resistance of the rod affects the force sense estimation and also affects the controllability of the surgical tool. In particular, in the force sense estimation using air pressure, it is important to transmit the force received from the surgical tool as directly as possible to the rod (piston) of the actuator. By eliminating the sliding resistance and transmission loss during operation between the surgical tool and the actuator as much as possible, a system that can detect minute external force is realized. Therefore, it is advantageous to suppress the transmission of runout components included in the operation of each element in order to improve the treatment accuracy in the medical robot.

It is an aspect to provide a floating drive for a medical robot capable of improving the treatment accuracy in a medical robot that manipulates a surgical tool by using the driving force of an actuator. It is another aspect to provide a medical robot including such a floating drive.

A floating drive for a medical robot according to some embodiments may include an actuator that drives a rod to be able to move forward and backward in a first direction; a manipulation member that operates with driving force of the actuator; and a transmission member that is located between the actuator and the manipulation member and is engaged with the rod to transmit an operation of the rod to the manipulation member. The transmission member may be restricted in its movement in a second direction orthogonal to the first direction and may be separated from the rod in the second direction. The transmission member may transmit the force in the first direction from the rod to the manipulation member.

According to such a configuration, the operation of the rod in the first direction is transmitted to the manipulation member via the transmission member. On the other hand, when the manipulation member moves in a direction including a component other than the first direction, the force having a component in the second direction (any of all the in-plane directions on a plane orthogonal to the first direction) due to the movement of the manipulation member is applied to the transmission member, but the transmission member is restricted in its movement in the second direction, and therefore the force is absorbed by the transmission member and is suppressed from being transmitted to the rod. That is, the transmission member whose movement in the second direction is restricted suppresses the transmission of the force to the rod caused by the movement of the manipulation member in a direction other than the first direction; therefore, only the force in the first direction is applied to the rod, and the increase in the sliding resistance of the rod can be suppressed. Specific examples of the movement of the manipulation member in a direction other than the first direction may include the manipulation member moving in the second direction (in-plane direction on the plane orthogonal to the first direction), but also the manipulation member moving forward and backward in a tilted state with respect to the first direction. Even by such a tilted forward/backward movement, the force having a component in the second direction is applied from the manipulation member to the transmission member. Moreover, also when the manipulation member rotates around the first direction, the force having a component in the second direction is applied to the transmission member by a member (e.g., a convex portion described later) fixed with respect to the manipulation member at a position away from the center of rotation.

In some embodiments, in the above floating drive for a medical robot, the rod may have a rod reception portion that receives a part of the transmission member, and the rod may come into contact with the transmission member located in the rod reception portion, thereby allowing the operation of the rod in the first direction to be transmitted to the transmission member. By receiving a part of the transmission member in the rod reception portion, it is possible to transmit the force in the first direction without fastening the rod and the transmission member.

In some embodiments, in the above floating drive for a medical robot, the transmission member may be provided with a slit having an opening in the second direction, and the rod reception portion may be located inside the slit. This operation allows a gap to be provided in the second direction between the rod reception portion and the slit, and the gap can absorb the force in the second direction. For example, when the force is applied from the surgical tool side, the slit of the transmission member can receive the component of the force in the second direction so that the force in the second direction is not transmitted to the rod side.

In some embodiments, in the above floating drive for a medical robot, the transmission member may have a transmission receiving portion that receives a part of the manipulation member, and the transmission member may come into contact with the manipulation member located in the transmission receiving portion, thereby allowing an operation of the transmission member in the first direction to be transmitted to the manipulation member. By receiving a part of the manipulation member in the transmission receiving portion, it is possible to transmit the force in the first direction without fastening the transmission member and the manipulation member.

In some embodiments, in the above floating drive for a medical robot, the transmission receiving portion may receive the part of the manipulation member so as to absorb a displacement of the part of the manipulation member in the second direction. This operation allows the part of the manipulation member to be received in the transmission receiving portion, and the transmission of the force in the first direction and the absorbance of the force in the second direction can thereby be performed without fastening the transmission member and the manipulation member.

In some embodiments, the above floating drive for a medical robot may further include a linear motion guide that supports a scale portion of a linear encoder in a movable manner in the first direction, and the transmission member may be fixed to the scale portion and provided so as to be movable in the first direction together with the scale portion. The transmission member fixed to the scale portion may move in the first direction together with the scale portion by the support of the linear motion guide. Even if the forward/backward direction of the rod and the linear motion direction by the linear motion guide are not parallel to each other, the transmission member can absorb the deviation in the second direction to suppress the increase in the sliding resistance of the rod.

In some embodiments, in the above floating drive for a medical robot, the scale portion may be disposed to face a housing of the actuator, and a detector of the linear encoder may be attached to the housing. With this configuration, the wiring of the detector which measures the position of the scale portion does not have to move because the scale portion of the linear encoder is movable. Moreover, the rigidity of the scale portion, which is a large member, suppresses the movement of the transmission member in the second direction. Furthermore, the accuracy of the linear motion of the transmission member is ensured by the linear motion guide which supports the scale portion; therefore, it suffices that the actuator may drive, and the driving direction may be slightly deviated from the first direction.

In some embodiments, in the above floating drive for a medical robot, the actuator may drive the rod by air pressure. In this case, a medical robot including such a floating drive can perform force sense estimation using the air pressure. That is, another aspect of some embodiments may provide a medical robot including: the above floating drive which drives the rod by the air pressure; and a pneumatic force sensor that estimates external force in the first direction applied to the rod based on measurement of the air pressure.

Accordingly, it is possible to provide a floating drive mechanism for a medical robot capable of improving the treatment accuracy in a medical robot that manipulates a surgical tool by using the driving force of an actuator. Moreover, the measurement accuracy of a medical robot including such a floating drive mechanism can be enhanced.

Hereinafter, one or more embodiments will be described with reference to the drawings. In the following description, the same members are denoted by the same reference numerals and the description of members once explained may be omitted.

(Configuration of Floating Drive for Medical Robot)

Figure 1:
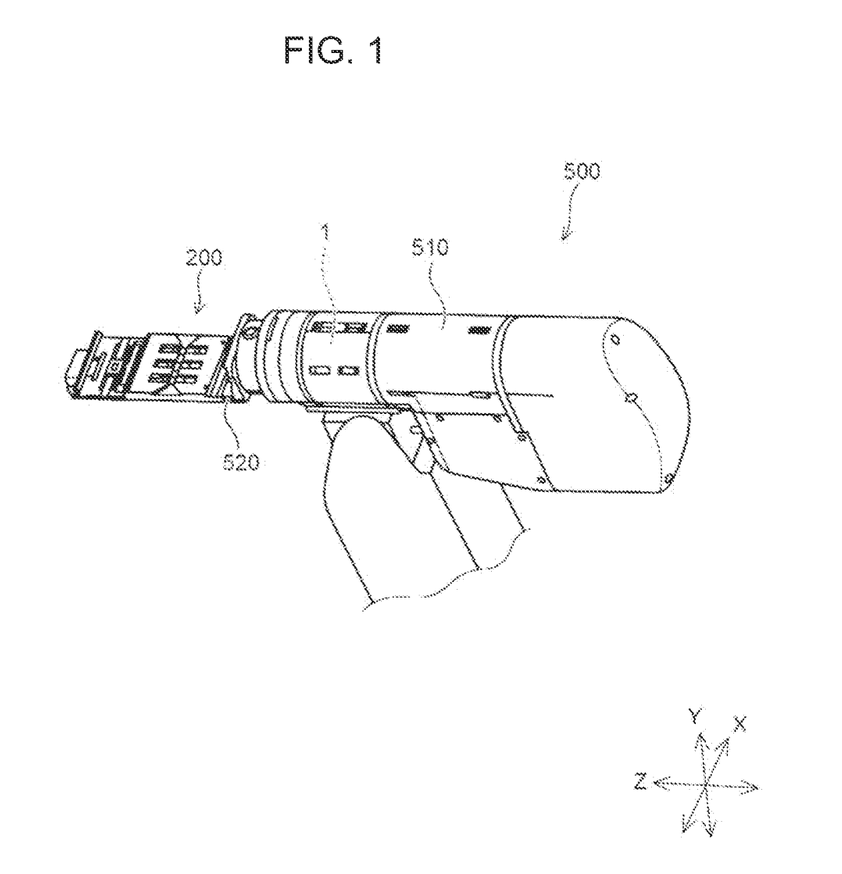
FIG. 1 is a perspective view exemplifying a medical robot, according to some embodiments.

FIG. 1 is a perspective view exemplifying a medical robot, according to some embodiments.

Figure 2:
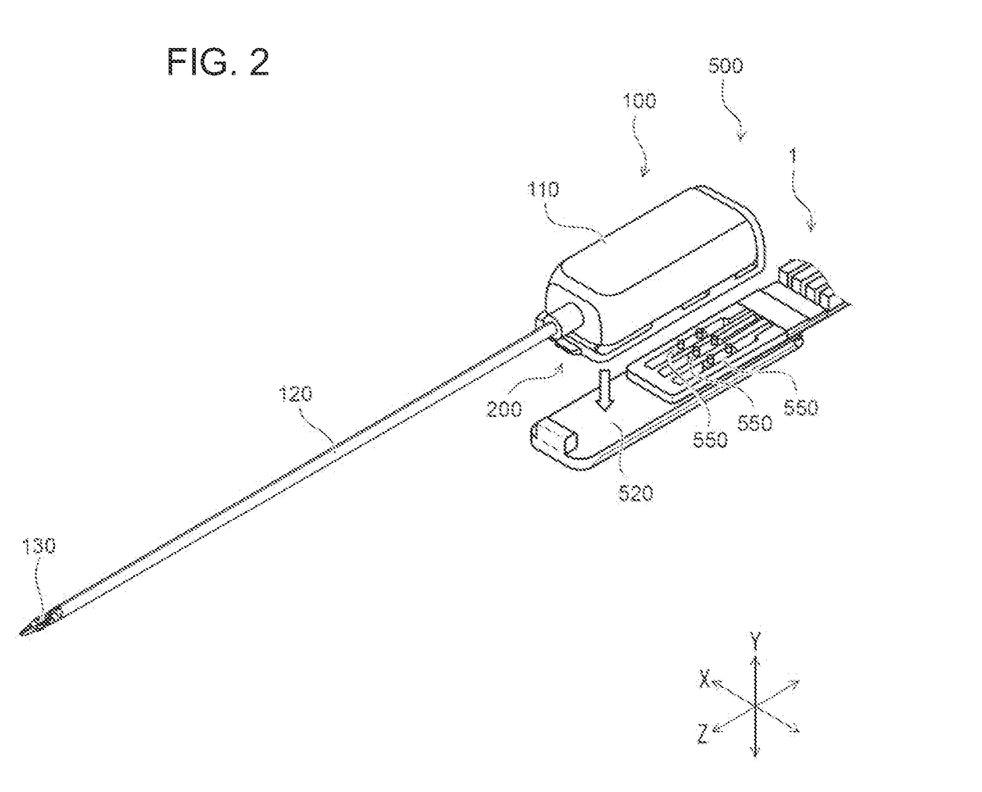
FIG. 2 is a perspective view exemplifying the attaching state of a surgical tool, according to some embodiments.

FIG. 2 is a perspective view exemplifying the attaching state of a surgical tool, according to some embodiments.

Figure 3A:
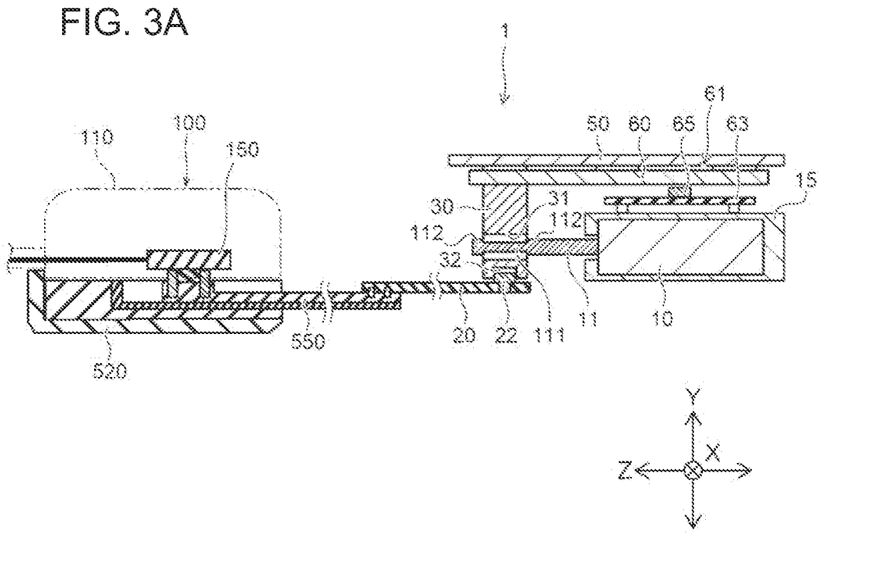
FIGS. 3A and 3B are schematic views exemplifying a floating drive for a medical robot, according to some embodiments.
Figure 3B:
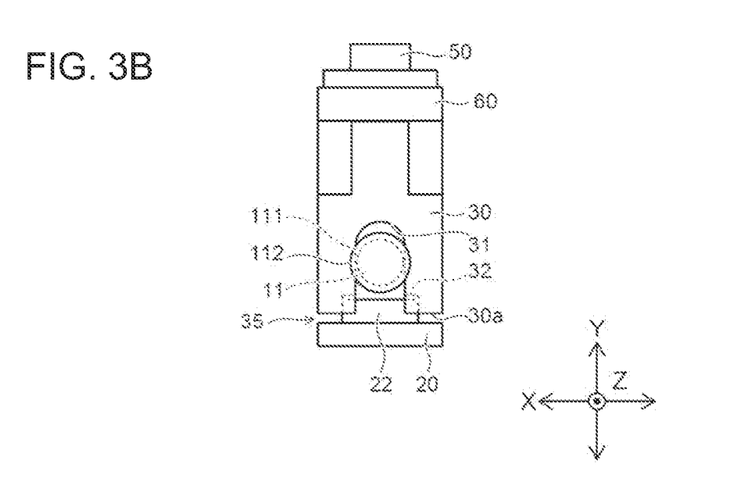

FIGS. 3A and 3B are schematic views exemplifying a floating drive for a medical robot, wherein FIG. 3A is a cross-sectional view and FIG. 3B is a front view, according to some embodiments.

Figure 4A:
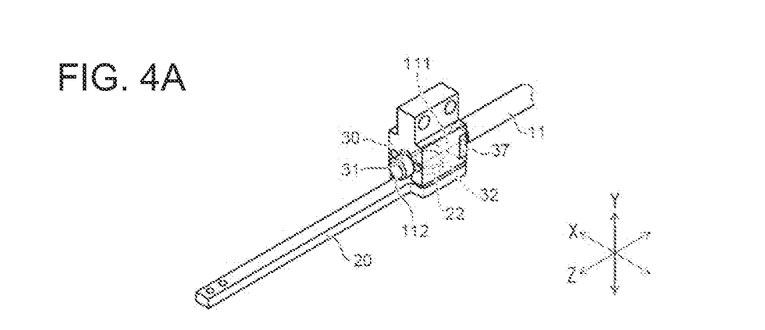
FIGS. 4A and 4B are perspective views exemplifying a transmission member, according to some embodiments.
Figure 4B:
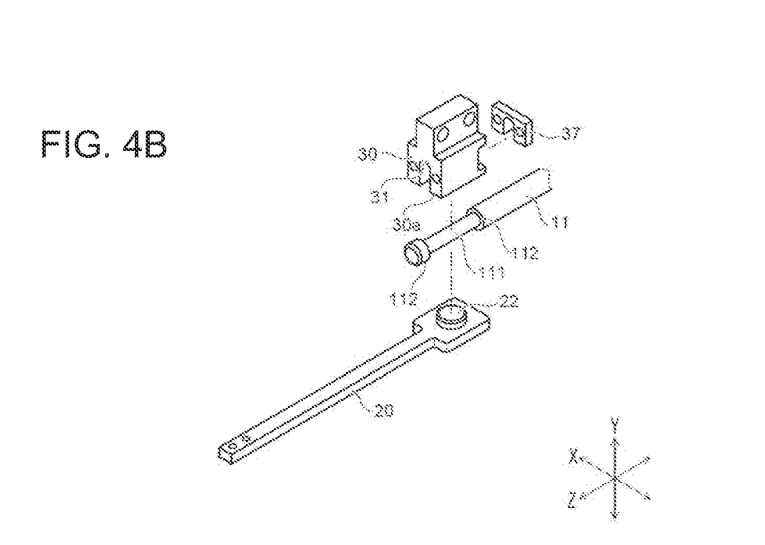

FIGS. 4A and 4B are perspective views exemplifying a transmission member, wherein FIG. 4A is a perspective view and FIG. 4B is an exploded perspective view, according to some embodiments.

As illustrated in FIGS. 1 and 2, a medical robot 500 has a multi-degree-of-freedom arm 510 that is a manipulator that may be remotely controlled. The tip portion of the multi-degree-of-freedom arm 510 is provided with a mounting portion 520 to which a surgical tool 100 is attached. The surgical tool 100 is attached to the multi-degree-of-freedom arm 510 via a drape 200.

The drape 200 is disposed between the medical robot 500, which holds the surgical tool 100, and the surgical tool 100 and serves to isolate the surgical tool 100 and the medical robot 500 from each other. The drape 200 also serves to transmit power in the forward/backward direction from a power transmission part 550 of the medical robot 500 to a movable part 150 (see FIG. 3A) provided in the surgical tool 100.

The tip portion (mounting portion 520) of the multi-degree-of-freedom arm 510 is configured to be rotatable around an axis in the extending direction. The arm portion of the multi-degree-of-freedom arm 510 is also axially rotatable. The surgical tool 100 attached to the medical robot 500 can therefore approach a patient from various angles by using the multi-degree-of-freedom arm 510.

As illustrated in FIG. 2, in some embodiments, the surgical tool 100 includes a main body 110, a shaft 120 extending from the main body 110, and a treatment part 130 provided at the tip of the shaft 120 (an end portion opposite to the main body 110). The treatment part 130 is, for example, forceps.

The medical robot 500 is provided with a floating drive 1 for driving the power transmission part 550. The floating drive 1 is incorporated in the housing of the multi-degree-of-freedom arm 510 (see FIG. 1).

As illustrated in FIG. 3A, in some embodiments, the floating drive 1 includes an actuator 10 that drives a rod 11 to be able to move forward and backward, a manipulation member 20 that operates with the driving force of the actuator 10, and a transmission member 30 located between the actuator 10 and the manipulation member 20. In some embodiments, the transmission member 30 may be a plate having a notch therein. In some embodiments the transmission member 30 may be a wishbone shaped or "Y" shaped member provided with a plurality of hole for fasteners to attach thereto. In some embodiments the transmission member 30 may be formed of a rectangular block with two additional rectangular blocks provided at an end of the first rectangular block and separated by less than a width of the first rectangular block. Wherein the transmission member 30 has a space between the two additional blocks that is not filled with material. The transmission member 20 may be a fully rectangular or square block or may be another shape. In some embodiments, the manipulation member 20 may be a plate comprising a length member and a square member in the same plane as the length member. The manipulation member 20 is engaged with the rod 11 in the rod reception portion 111. The rod reception portion 111 is engaged with the convex portion 22 provided on the square member of the manipulation member 20.

Here, for convenience of description, the forward/backward movement direction of the rod 11 will be referred to as a Z direction, one of the directions orthogonal to the Z direction will be referred to as an X direction, and the direction orthogonal to the Z direction and the X direction will be referred to as a Y direction. The Z direction is an example of the first direction, and any of the X direction and Y direction orthogonal to the Z direction is an example of the second direction.

The actuator 10 generates power to linearly move the rod 11 in the forward/backward direction (Z direction) based on a control signal output from a controller (not illustrated). As the actuator 10, for example, a pneumatic cylinder that generates the power by air pressure is used. The actuator 10 may be one that is driven by electromagnetic force rather than air pressure or one that is driven by another known driving method.

The manipulation member 20 is provided so as to be movable by the forward/backward operation of the rod 11 of the actuator 10. The moving direction of the manipulation member 20 is, for example, the Z direction. The moving direction of the manipulation member 20 does not necessarily have to coincide with the Z direction, and it suffices that a component in the Z direction is included. The manipulation member 20 is coupled to the power transmission part 550 and transmits the driving force of the actuator 10 to the power transmission part 550. The manipulation member 20 and the power transmission part 550 may be separate or integrated.

The transmission member 30 is a member that couples the rod 11 and the manipulation member 20 together. In some embodiments, the transmission member 30 is restricted in its movement in the Y direction and the X direction and is separated from the rod 11 in the Y direction. The transmission member 30 is provided so as to transmit the force in the Z direction from the rod 11 to the manipulation member 20.

As illustrated in FIG. 3B, in some embodiments, the transmission member 30 is provided with a slit 31 that penetrates in the Z direction as the first direction. The slit 31 opens on one side in the Y direction as the second direction. The rod 11 is inserted in the slit 31, and a gap in the Y direction is provided between the rod 11 and the transmission member 30 in the slit 31.

The rod 11 is provided with a rod reception portion 111 that receives a part of the transmission member 30. The rod reception portion 111 is a diameter-reduced portion provided in a part of the rod 11, and the rod 11 is fitted in the slit 31 at the rod reception portion 111. Both sides of the rod reception portion 111 in the Z direction are provided with portions having a diameter relatively larger than that of the rod reception portion 111 (referred to as diameter-enlarged portions 112 for descriptive purposes).

The length of the rod reception portion 111 in the Z direction is approximately the same as that of the transmission member 30 in the Z direction. The diameter of the rod reception portion 111 is approximately the same as or slightly smaller than the width of the slit 31 in the X direction. The rod reception portion 111 is fitted in the slit 31, and the transmission member 30 and the rod 11 are thereby separated from each other in the Y direction, but are coupled together in the Z direction without a gap because the diameter-enlarged portions 112 serve as stoppers.

By having such a structure, even when the transmission member 30 is displaced in the Y direction, only the position of the rod reception portion 111 in the Y direction changes in the slit 31 of the transmission member 30, and the movement of the rod 11 in the Z direction is not affected; therefore, the increase in the sliding resistance of the rod 11 in the Z direction is less likely to occur.

Moreover, in some embodiments, the width of the slit 31 in the X direction is set slightly larger than the diameter of the rod reception portion 111, and gaps between the transmission member 30 and the rod 11 in the X direction are therefore narrower than a gap in the Y direction. The diameter of the rod reception portion 111 may be positively set smaller than the width of the slit 31 in the X direction. This operation allows the gaps between the transmission member 30 and the rod 11 in the X direction to be widened in the slit 31, and it is thus more stably realized to reduce the influence of the displacement of the transmission member 30 in the X direction on the movement of the rod in the Z direction.

One end portion of the transmission member 30 in the Y direction is fixed to a scale portion 60 of a linear encoder 61 supported by a linear motion guide 50. The linear motion guide 50 supports the scale portion 60 so that it is movable in the Z direction. The transmission member 30 therefore comes to a state of being supported by the linear motion guide 50 via the scale portion 60 and is supported so as to be linearly movable in the Z direction together with the scale portion 60.

Thus, the transmission member 30 is integrated with the scale portion 60, which is a member having a large mass, and is restricted in the movement in directions other than the Z direction (X direction and Y direction) by the linear motion guide 50. Accordingly, even when the external force in a direction other than the Z direction is applied to the transmission member 30, for example, from the manipulation member 20 side, the linear motion guide 50 can resist the external force, and as a result, the external force in a direction other than the Z direction is suppressed from transmitting to the rod 11 coupled to the transmission member 30.

The other end portion of the transmission member 30 in the Y direction is provided with a coupling portion 35 to which the manipulation member 20 is coupled. The coupling portion 35 has a concave portion 32 as a transmission receiving portion that is provided at the other end of the transmission member 30 and recessed in the Y direction (second direction) and a convex portion 22 that is provided on the manipulation member 20 and protrudes in the Y direction (second direction). The concave portion 32 and the convex portion 22 are fitted together in the Y direction (second direction) thereby to couple the transmission member 30 and the manipulation member 20 to each other. The coupling portion 35 may be convex on the transmission member 30 side and concave on the manipulation member 20 side.

In some embodiments, the convex portion 22 is provided in a cylindrical shape, and the concave portion 32 has a concave shape corresponding to the cylindrical shape of the convex portion 22. The inner diameter of the concave portion 32 is provided to be approximately the same as or slightly larger than the outer diameter of the convex portion 22. In a state in which the convex portion 22 is fitted in the concave portion 32, a gap is provided in the Y direction, and the convex portion 22 and the concave portion 32 are coupled together with almost no gaps in the Z direction and the X direction.

Moreover, in the state in which the convex portion 22 is fitted in the concave portion 32, gaps are provided between surfaces 30a of the transmission member 30 on the manipulation member 20 side and the manipulation member 20. Therefore, the transmission member 30 and the manipulation member 20 are separated from each other in the Y direction, but are coupled together in the Z direction with almost no gap. By being in such a coupled state, even when the operation of the manipulation member 20 has a component in the Y direction, the displacement of the Y-direction component of the convex portion 22 provided on the manipulation member 20 is avoided from causing the external force to the transmission member 30 in the Y-direction, provided that the displacement of the Y-direction component of the convex portion 22 is within a range of the above gap with the concave portion 32.

From the viewpoint of reducing the influence on the treatment or the like, the manipulation member 20 or the power transmission part 550 may become longer in the Z direction. In such a case, the linearity of the operation of the manipulation member 20 may be lowered to readily cause a displacement of components in other directions than the Z direction, such as the Y direction. Even in such a case, in the floating drive 1 according to some embodiments, the displacement of the manipulation member 20 in the Y direction is absorbed by the concave portion 32 of the transmission member 30, and the external force in the Y direction is suppressed from generating in the transmission member 30.

Even when the external force in the Y direction is generated in the transmission member 30, the external force in the Y direction applied to the transmission member 30 is less likely to cause a displacement of the transmission member 30 because the transmission member 30 is supported by the linear motion guide 50 integrally with the scale portion 60.

Furthermore, even when the transmission member 30 is displaced in the Y direction, the structure in which the rod reception portion 111 is accommodated in the slit 31 allows the slit 31 to absorb therein the displacement of the transmission member 30 in the Y direction, and the external force in the Y direction to the rod 11 is less likely to be generated.

(Coupled State of Rod, Manipulation Member, and Transmission Member)

As illustrated in FIGS. 4A and 4B, in some embodiments, the rod 11 and the manipulation member 20 are coupled together via the transmission member 30. In a state in which the transmission member 30 is connected to the scale portion 60 (see FIG. 3), the rod reception portion 111 of the rod 11 is fitted into the slit 31 of the transmission member 30.

An adjustment part 37 may be attached to the transmission member 30. The adjustment part 37 is attached to the end portion of the transmission member 30 in the Z direction and can adjust the attaching position in the Z direction by screws (not illustrated). The adjustment part 37 is provided between the transmission member 30 and the diameter-enlarged portion 112 of the rod 11 in a state in which the rod reception portion 111 of the rod 11 is fitted in the slit 31 of the transmission member 30.

The coupled state (contact state) between the transmission member 30 and the rod 11 is adjusted by the position of the adjustment part 37 in the Z direction. That is, if the adjustment part 37 is adjusted proximally with respect to the transmission member 30, the gap between the adjustment part 37 and the diameter-enlarged portion 112 is widened, and the relative positional change between the transmission member 30 and the rod 11 in the Y direction is readily accepted, but the tolerance in the Z direction increases.

On the other hand, if the adjustment part 37 is adjusted distally with respect to the transmission member 30, the gap between the adjustment part 37 and the diameter-enlarged portion 112 is narrowed, and the tolerance in the Z direction is reduced. If the adjustment part 37 is adjusted further distally with respect to the transmission member 30, the contact strength can be enhanced. However, if the contact strength is unduly high, it becomes difficult to accept the relative positional change between the transmission member 30 and the rod 11 in the Y direction.

There are manufacturing variations in the lengths of the rod reception portion 111 and transmission member 30 in the Z direction. Therefore, by providing the adjustment part 37, the engagement relationship between the rod reception portion 111 and the transmission member 30 can be adjusted so that the force in the Z direction is transmitted with less waste as much as possible between the rod 11 and the transmission member 30 and the force in the Y direction can be sufficiently absorbed.

Moreover, the convex portion 22 of the manipulation member 20 is fitted in the concave portion 32 of the transmission member 30. Gaps are provided between the concave portion 32 and the convex portion 22 and between the surfaces 30a of the transmission member 30 on the manipulation member 20 side and the manipulation member 20. This operation allows the force in the Y direction from the manipulation member 20 to the transmission member 30 to be absorbed within the ranges of these gaps.

By forming the convex portion 22 into a cylindrical shape and forming the concave portion 32 into a recessed shape corresponding to the convex portion 22, it becomes easy to accept the positional change in the fitting between the convex portion 22 and the concave portion 32 around the axis (around the central axis of the cylindrical shape).

In some embodiments, the coupling between the rod 11 and the manipulation member 20 via such a transmission member 30 accepts the relative positional change between the transmission member 30 and the rod 11 in the Y direction and the relative positional change between the transmission member 30 and the manipulation member 20 in the Y direction. On the other hand, it is possible to configure a coupled state in which the relative positional change between the transmission member 30 and the rod 11 in the Z direction is almost not accepted and the relative positional change between the transmission member 30 and the manipulation member 20 in the Z direction is also almost not accepted.

(Operation of Floating Drive)

Figure 5A:
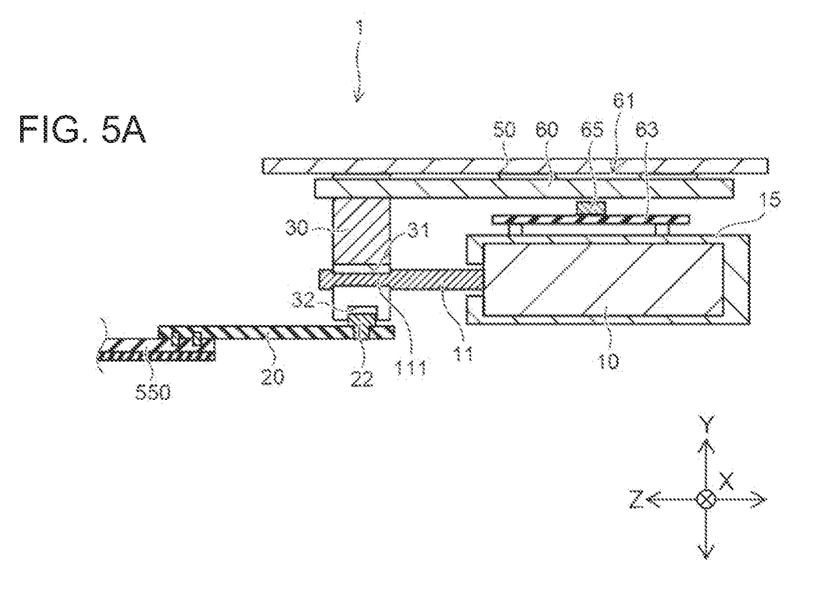
FIGS. 5A and 5B are schematic cross-sectional views exemplifying an operation of the floating drive, according to some embodiments.
Figure 5B:
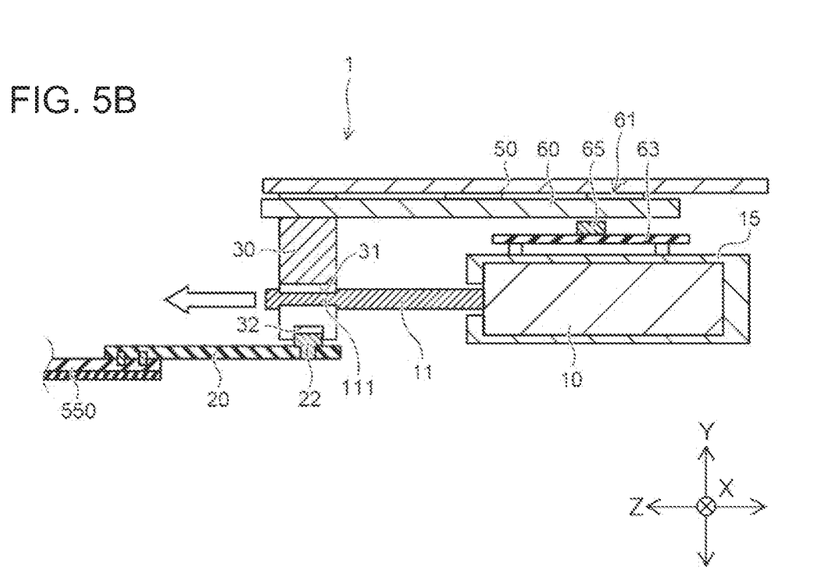

FIGS. 5A and 5B are schematic cross-sectional views exemplifying the operation of the floating drive, according to some embodiments.

FIG. 5A illustrates a state in which the rod 11 is at an intermediate position, and FIG. 5B illustrates a state in which the rod 11 is at an extended position.

When the rod 11 is driven in the Z direction by the actuator 10, the driving force in the Z direction is transmitted from the rod 11 to the transmission member 30 and is further transmitted from the transmission member 30 to the manipulation member 20. This operation the manipulation member 20 to operate to move the power transmission part 550 forward and backward. By moving the power transmission part 550 forward and backward, the treatment part 130 of the surgical tool 100 (see FIG. 2) can be operated.

In such an operation of the rod 11, as the rod 11 moves in the Z direction, the scale portion 60 moves in the Z direction along the linear motion guide 50 via the transmission member 30. A substrate 63 on which a detector 65 of the linear encoder 61 is mounted is attached to a housing 15 of the actuator 10 facing the scale portion 60. This operation allows the scale portion 60 and the detector 65 to be arranged so as to face each other. In the some embodiments, the scale portion 60 is movable, and the detector 65 which measures the position of the scale portion 60 is fixed. Therefore, the wiring of the detector 65 is also fixed and can be easily routed, and the durability of the wiring can thus be improved.

Moreover, the rigidity of the scale portion 60, which is a large member, suppresses the movement of the transmission member 30 in the X direction and the Y direction. This operation allows the transmission member 30 to accurately move in the Z direction. Furthermore, the accuracy of the linear motion of the manipulation member 20 is ensured by the linear motion guide 50 which supports the scale portion 60. It therefore suffices that the actuator 10 may be driven, and the driving direction of the rod 11 may be slightly deviated from the Y direction.

(Absorption of Force by Transmission Member)

Figure 6A:
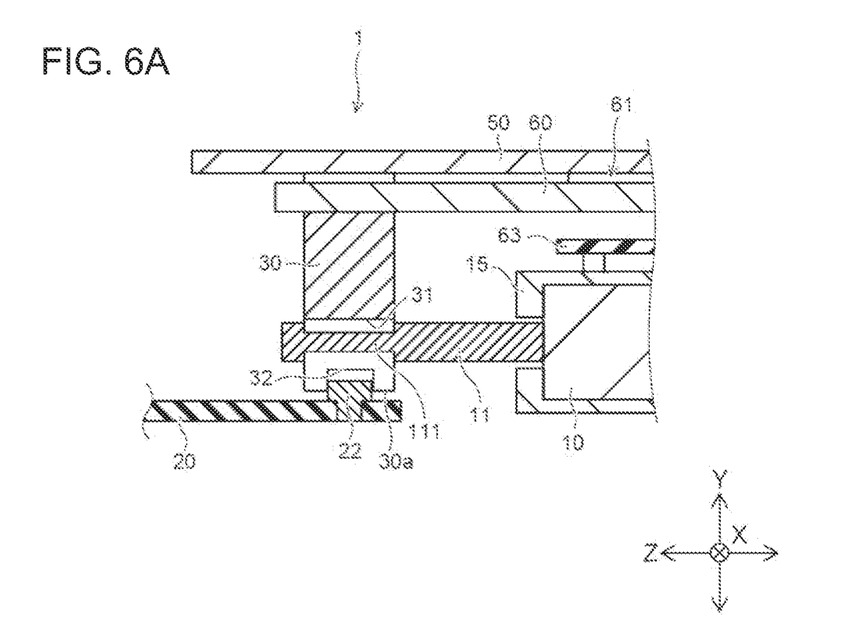
FIGS. 6A and 6B are schematic cross-sectional views illustrating the absorption of force in the Y direction by the transmission member, according to some embodiments.
Figure 6B:
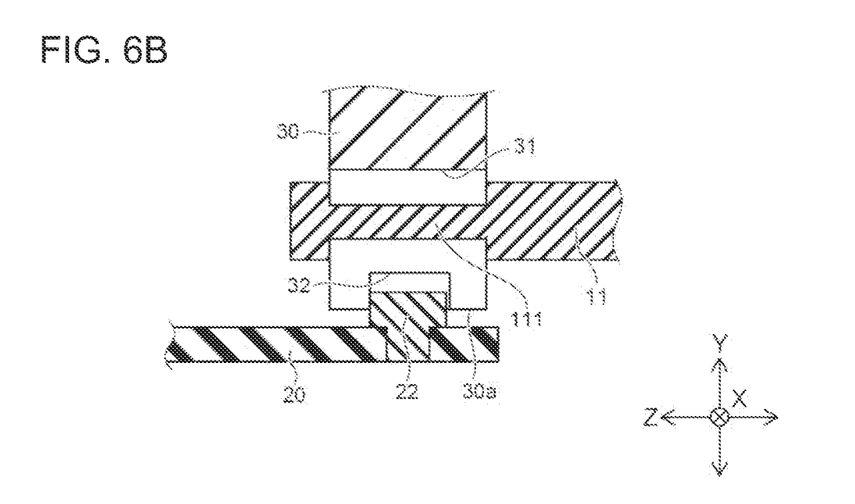

FIGS. 6A and 6B are schematic cross-sectional views exemplifying the absorption of force in the Y direction by the transmission member, according to some embodiments.

FIG. 6A illustrates an enlarged view of the fitting portion between the transmission member 30 and the rod 11. The slit 31 of the transmission member 30 and the rod reception portion 111 of the rod 11 are separated from each other in the Y direction. Here, the movement of the transmission member 30 is restricted by the linear motion guide 50, and there are cases in which the forward/backward direction of the rod 11 by the actuator 10 and the guide direction by the linear motion guide 50 do not necessarily match (cases in which the interval in the Y direction is not constant (the forward/backward direction and the guide direction are not parallel in the Z direction)).

In such a case, even when there is a relative positional change between the rod 11 and the transmission member 30 in the Y direction due to the movement of the rod 11, the slit 31 of the transmission member 30 and the rod reception portion 111 of the rod 11 are separated from each other in the Y direction, and it is therefore possible to absorb the positional change in the Y direction within the range of the separation gap. This can suppress an increase in the sliding resistance of the rod 11 even when the linear motion guide 50 and the rod 11 are not parallel in the Z direction.

On the other hand, in the Z direction, there is almost no relative positional change between the transmission member 30 and the rod 11, and the driving force of the rod 11 in the Z direction can be reliably transmitted to the transmission member 30.

FIG. 6B illustrates an enlarged view of the fitting portion between the transmission member 30 and the manipulation member 20. The concave portion 32 of the transmission member 30 and the convex portion 22 of the manipulation member 20 are separated from each other in the Y direction. The surfaces of the transmission member 30 on the manipulation member 20 side and the manipulation member 20 are also separated in the Y direction.

For this reason, even when there is a relative positional change between the transmission member 30 and the manipulation member 20 in the Y direction due to the movement of the transmission member 30, the positional change in the Y direction can be absorbed in the range of a gap formed between the transmission member 30 and the manipulation member 20 which are separated from each other in the Y direction. Thus, even when the force in the Y direction is applied from the manipulation member 20 toward the transmission member 30, the force can be suppressed from being transmitted to the transmission member 30 and further suppressed from being transmitted from the transmission member 30 to the rod 11.

When the practitioner manipulates the surgical tool 100 in the medical robot 500, it is advantageous to accurately transmit the driving force of the actuator 10 to the surgical tool 100. According to the coupled structure between the rod 11 and the transmission member 30 and the coupled structure between the transmission member 30 and the manipulation member 20 as in some embodiments, the unwanted external force can be suppressed from transmitting in the Y direction from the manipulation member 20 or transmission member 30 to the rod 11, and it is possible to suppress an increase in the sliding resistance of the rod 11. Therefore, the controllability of the surgical tool 100 by the operation of the actuator 10 is improved.

Moreover, when a force sensor that detects the force (reaction force) transmitted from the surgical tool 100 to the rod 11 during the treatment is provided, it is possible to suppress the unwanted external force in the Y direction from being transmitted to the rod 11, and the influence on the force sense estimation can be suppressed. Furthermore, the transmission member 30 of some embodiments does not have a complicated structure, and it is therefore possible to suppress the increase in size of members.

When the diameter of the rod reception portion 111 is set smaller than the width of the slit 31 in the X direction and the transmission member 30 and the rod 11 are separated from each other in the X direction, the relative positional change between the transmission member 30 and the rod 11 in the X direction can be absorbed, and it is possible to suppress the unwanted external force in the X direction from being transmitted to the rod 11.

(Example of Multiple Manipulation Members)

Figure 7:
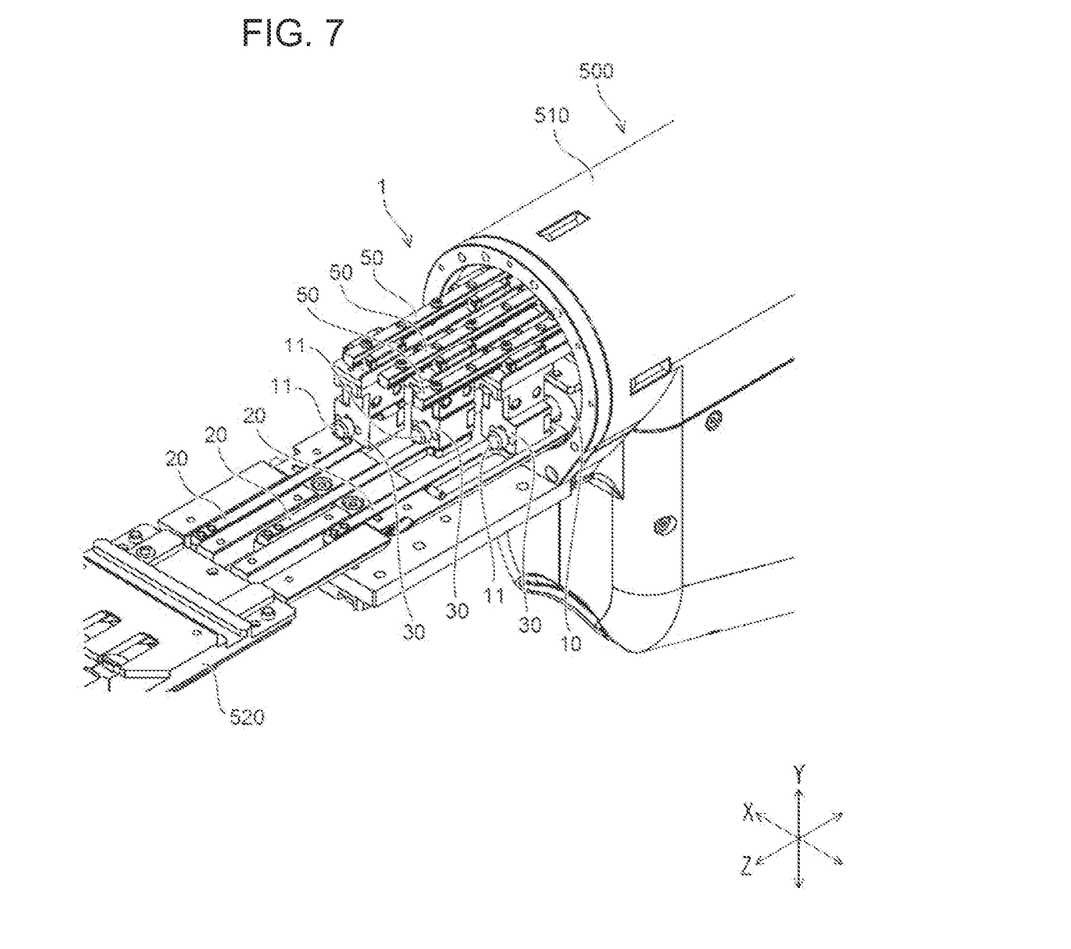
FIG. 7 is a perspective view exemplifying a medical robot provided with a plurality of manipulation members, according to some embodiments.

FIG. 7 is a perspective view exemplifying a medical robot provided with a plurality of manipulation members, according to some embodiments.

In the example illustrated in FIG. 7, two or more manipulation members 20 (three manipulation members 20 in the illustrated example) are juxtaposed in the X direction, and respective transmission members 30 and respective actuators 10 are provided corresponding to the manipulation members 20. The transmission members 30 are connected to respective scale portions 60, and the scale portions 60 are supported by respective linear motion guides 50. These configurations are incorporated in the housing of one multi-degree-of-freedom arm 510.

In some embodiments, by reducing the size of the transmission members 30, it is possible to incorporate the transmission members 30 that may absorb the external force in the Y direction even in a configuration in which such two or more manipulation members 20 are juxtaposed.

Thus, according to some embodiments, it becomes possible to provide the floating drive 1 for the medical robot 500 that may improve the treatment accuracy in the medical robot 500 which manipulates the surgical tool 100 by using the driving force of the actuator 10.

Figure 8:
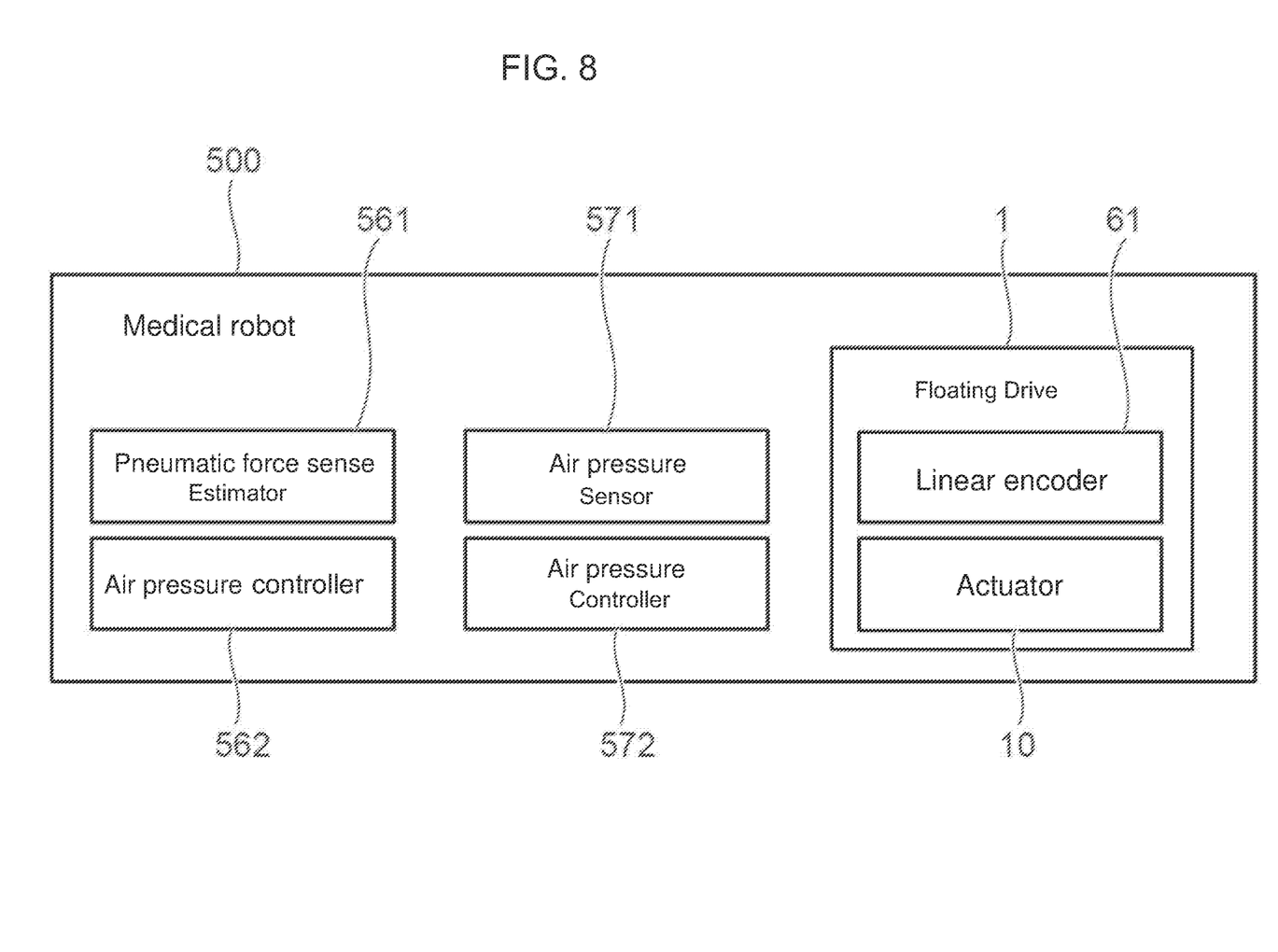
FIG. 8 is a block diagram for describing a force sensor of a medical robot, according to some embodiments.

FIG. 8 is a block diagram for describing force sense estimation of a medical robot. The medical robot 500 includes a pneumatic force sense estimator 561, an air pressure controller 562, an air pressure sensor 571, and an air pressure controller 572 in addition to the previously described floating drive 1. In some embodiments, the medical robot 500 may include one or more processors that is configured to perform the functions of the pneumatic force sense estimator 561, the air pressure controller 562, the air pressure sensor 571, and the air pressure controller 572. The one or more processors may each be a central processing unit (CPU), a microprocessor, or a microcontroller, or hardware control logic configured to implement the functions of the pneumatic force sense estimator 561, the air pressure controller 562, the air pressure sensor 571, and the air pressure controller 572. The air pressure controller 562 outputs a control signal for controlling the air pressure controller 572, which uses this control signal to change the pressure of air supplied to the actuator 10, thereby displacing the rod of the actuator 10. The linear encoder 61 of the floating drive 1 measures the position of the rod 11 of the actuator 10. The air pressure sensor 571 measures the pressure of air supplied from the air pressure controller 572 to the actuator 10.

The pneumatic force sense estimator 561 obtains the force applied to the rod 11 in the first direction (Z direction) based on the information regarding the position of the rod 11 from the linear encoder 61 and the information regarding the air pressure from the air pressure sensor 571 and estimates the force at each portion of the treatment part 130 of the surgical tool 100 based on the obtained force applied to the rod 11. For example, when the treatment part 130 is a forceps, the pneumatic force sense estimator 561 can estimate the external force which changes the inclination angle of the forceps with respect to the first direction (Z direction) and the gripping force of the forceps.

As previously described, the floating drive 1 for the medical robot 500 according to the some embodiments includes the transmission member 30, etc. and therefore is less likely to increase the sliding resistance of the rod 11 in the Z direction. For this reason, the force applied to the rod 11 in the first direction (Z direction) obtained by the pneumatic force sense estimator 561 is not easily affected by the sliding resistance and can appropriately reflect the force applied to the treatment part 130 (such as forceps). Hence, the pneumatic force sense estimator 561 can more accurately estimate the force at each portion of the treatment part 130 of the surgical tool 100.

Although the some embodiments have been described above, the present disclosure is not limited to these examples. For example, an example of the forceps has been described as the treatment part 130 of the surgical tool 100, but a treatment part 130 other than the forceps may be employed. Moreover, the scope of the present disclosure encompasses those to which a person skilled in the art appropriately makes addition or removal of constitutional elements or design changes with respect to the previously-described embodiments or specific examples and those in which features of the embodiments are appropriately combined, provided that they have the subject matters of the present disclosure.

Thus, it should be understood that the present disclosure is not limited to the above embodiments, but various other changes and modifications may be made therein without departing from the spirit and scope of the appended claims

What is claimed is:

1. A floating drive for a medical robot, the floating drive comprising:
    an actuator that drives a rod forward and backward in a first direction;
    a manipulation member that operates with a driving force of the actuator; and
    a linear motion guide that supports a scale portion of a linear encoder;
    a transmission member located between the actuator and the manipulation member, the transmission member being engaged with the rod to transmit an operation of the rod to the manipulation member,
    wherein the transmission member is fixed to the scale portion and has a displacement having a component in a second direction orthogonal to the first direction, and the displacement of the transmission member is restricted, and
    the transmission member is separated from the rod in the second direction and transmits force in the first direction from the rod to the manipulation member.

2. The floating drive for a medical robot according to claim 1, wherein:
    the rod comprises a rod reception portion that receives a part of the transmission member, and
    the rod contacts part of the transmission member such that the operation of the rod in the first direction is transmitted to the transmission member.

3. The floating drive for a medical robot according to claim 2, wherein:
    the transmission member comprises a slit having an opening in the second direction, and the rod reception portion is located inside the slit.

4. The floating drive for a medical robot according to claim 1, wherein:
    the transmission member comprises a transmission receiving portion that receives a part of the manipulation member, and
    the transmission member contacts the part of the manipulation member such that an operation of the transmission member in the first direction is transmitted to the manipulation member.

5. The floating drive for a medical robot according to claim 4, wherein the transmission receiving portion absorbs a displacement of the part of the manipulation member in the second direction.

6. The floating drive for a medical robot according to claim 1,
    wherein the linear motion guide supports the scale portion of the linear encoder in a movable manner in the first direction,
    wherein the transmission member is movable in the first direction together with the scale portion.

7. The floating drive for a medical robot according to claim 6, further comprising:
    a housing that houses the actuator,
    wherein the linear encoder comprises a detector,
    the scale portion is disposed to face the housing of the actuator, and
    the detector is attached to the housing.

8. The floating drive for a medical robot according to claim 1, wherein the actuator drives the rod by air pressure.

9. A medical robot comprising:
    a floating drive that includes:
        an actuator that drives a rod forward and backward in a first direction by air pressure;
        a manipulation member that operates with a driving force of the actuator; and
        a transmission member located between the actuator and the manipulation member, the transmission member being engaged with the rod to transmit an operation of the rod to the manipulation member; and
        a processor or hardware control logic that is configured to estimate an external force in the first direction applied to the rod, based on a measurement of the air pressure,
        wherein the transmission member has a displacement having a component in a second direction orthogonal to the first direction, and the displacement of the transmission member is restricted, and
        wherein the transmission member is separated from the rod in the second direction and transmits force in the first direction from the rod to the manipulation member.

10. An apparatus for a medical robot, the apparatus comprising:
    an actuator that drives a rod to move forward and backward in a first direction;
    a plate comprising a first portion extending in a length direction and a second portion connected to the first portion in a same plane as the first portion, the plate operating with a driving force of the actuator; and
    a first rectangular block with at least one second rectangular block provided at an end of the first rectangular block and separated by less than a width of the first rectangular block, the first rectangular block with the at least one second rectangular block being located between the actuator and the plate and being engaged with the rod to transmit an operation of the rod to the plate.

11. The apparatus according to claim 10, wherein a displacement of the first rectangular block with the at least one second rectangular block is restricted by a component in a second direction that is orthogonal to the first direction, and the first rectangular block with the at least one second rectangular block is separated from the rod in the second direction and transmits a force in the first direction from the rod to the plate.

12. The medical robot according to claim 9,
    wherein the floating drive further includes a linear motion guide that supports a scale portion of a linear encoder;
    wherein the transmission member is fixed to the scale portion.

* * * * *